United States Patent [19]

Pelouch et al.

[11] Patent Number: 5,383,198
[45] Date of Patent: Jan. 17, 1995

[54] SELF-STARTING MODE-LOCKED RING CAVITY LASER

[75] Inventors: Wayne S. Pelouch, Albuquerque, N. Mex.; Peter E. Powers; Chung L. Tang, both of Ithaca, N.Y.

[73] Assignee: Cornell Research Foundation, Inc., Ithaca, N.Y.

[21] Appl. No.: 140,503

[22] Filed: Oct. 25, 1993

[51] Int. Cl.$^6$ ............................................. H01S 3/98
[52] U.S. Cl. ........................................ 372/18; 372/94; 372/99; 372/26; 372/97
[58] Field of Search ................. 372/18, 25, 99, 94, 372/26, 97, 98

[56] References Cited

U.S. PATENT DOCUMENTS

| | | |
|---|---|---|
| 3,548,199 | 3/1968 | Geusic et al. |
| 3,949,323 | 4/1976 | Bierlein et al. |
| 4,085,335 | 4/1978 | Guilino |
| 4,517,675 | 5/1985 | Mourou et al. |
| 4,612,641 | 9/1986 | Corkum |
| 4,641,312 | 2/1987 | Schafer et al. |
| 4,646,308 | 2/1987 | Kafka et al. |
| 4,793,894 | 12/1988 | Jacco et al. |
| 4,815,080 | 3/1989 | Chesnoy et al. |
| 5,017,806 | 5/1991 | Edelstein et al. |
| 5,034,951 | 7/1991 | Edelstein et al. |
| 5,054,027 | 10/1991 | Goodberlet et al. ............ 372/18 |
| 5,305,334 | 4/1994 | Margaut et al. ............... 372/94 |
| 5,309,453 | 5/1994 | Treacy ........................ 372/18 |

OTHER PUBLICATIONS

Dawson et al., "Cavity-length Detuning Effects and Stabilization of a Synchronously Pumped Femtosecond Linear Dye Laser", Optics Letters, vol. 13, No. 2, Feb. 1988, pp. 126-128.
Fan et al., "High Power BaB$_2$O$_4$ Visible Optical Parametric Oscillator Pumped by Single-Axial-Mode 355-nm Pulses", Conference on Lasers and Electro-Optics, Apr. 1988, pp. 527-532.
Edelstein et al., "Femtosecond Ultraviolet Pulse Generation in B-BaB$_2$O$_4$", Appl. Phys. Lett. 52(26), 27 Jun. 1988, pp. 2211-2213.
Edelstein et al., "Broadly Tunable High Repetition Rate Femtosecond Optical Parametric Oscillator", Appl. Phys. Lett. 54(16), 1 May 1989 pp. 1728-1730.
Piskarskas et al., "Picosecond Optical Parametric Oscillator Pumped by Temporally Compressed Pulses from a Q-switched, Mode-Locked, cw-Pumped Nd:YAG Laser", Optics Letters, Jun. 1, 1989, vol. 14, No. 11, pp. 557-559.
Wachman et al., "Continuous-wave Mode-locked and Dispersion-compensated Femtosecond Optical Parametric Oscillator", Optics Letters, Jan. 15, 1990, vol. 15, No. 2, pp. 136-138.
Wright, "Quantum Theory of Self-Phase Modulation", J. Opt. Soc. Am. B/vol. 7, No. 6/Jun. 1990, pp. 1142-1146.
Cheung et al., "Theory of a Synchronously Pumped Optical Parametric Oscillator in Steady-State Operation", J. Opt. Soc. Am. B/vol. 7, No. 8, Aug. 1990, pp. 1385-1401.
Laenen et al., "Broadly Tunable Femtosecond Pulses Generated by Optical Parametric Oscillation", Optics Letters, Sep. 1, 1990, vol. 15, No. 17, pp. 971-973.
Spence et al., "60-fsec Pulse Generation from a Self-Mode-Locked Ti:Sapphire Laser", Optics Letters, vol. 16, No. 1, Jan. 1991, pp. 42-44.
Wachman et al., "cw Femtosecond Pulses Tunable in the Near- and Midinfrared", J. Appl. Phys. 70(3), 1 Aug. 1991, pp. 1893-1895.
Spence et al., "Regeneratively Initiated Self-mode-locked Ti:Sapphire Laser", Optics Letters, vol. 16, No. 22, Nov. 15, 1991, pp. 1762-1764.
Mak et al., "Externally Pumped High Repetition Rate Femtosecond Infrared Optical Parametric Oscillator", Appl. Phys. Lett. 60(5), 3 Feb. 1992, pp. 542-544.

*Primary Examiner*—Leon Scott, Jr.
*Attorney, Agent, or Firm*—Jones, Tullar & Cooper

[57] ABSTRACT

A self-mode-locked ring cavity laser incorporating a laser crystal such as Ti:Sapphire includes an external cavity for producing self-starting of mode-locked operation. The external cavity receives a portion of one of the continuous wave beams from the ring cavity modulates it, and retroreflects it back to the ring cavity to initiate mode-locked unidirectional operation. The unidirectional mode-locked operation is in a direction which decouples the external cavity.

11 Claims, 1 Drawing Sheet

SELF-STARTING MODE-LOCKED RING CAVITY LASER

BACKGROUND OF THE INVENTION

This invention was made with Government support under Contract No. F49620-90-C-0039 awarded by the Air Force Office of Scientific Research and under Grant No. ECS-9108570 awarded by the National Science Foundation. The Government has certain rights in the invention.

The present invention relates, in general, to a self-starting mode-locked laser, and more particularly to a self-starting mechanism for a laser that enables the laser to be self-starting within milliseconds while remaining completely unperturbed by the self-starting mechanism while it is mode locked. The apparatus includes a position-modulated mirror in an external cavity in which the cavity length and alignment are noncritical.

Recently, a great deal of emphasis has been placed on the development of passive mode-locking techniques for linear cavity lasers that would lead to self-starting, stable operation. Self-mode-locking has been demonstrated to produce short pulse widths and high output power without the need for additional cavity elements or optical modulation, and has been highly desirable for that reason. The onset of self-mode-locking, which has been attributed to the optical Kerr effect inside a laser crystal, requires formation of an intensity fluctuation in the cavity. Such an intensity fluctuation can be produced, in its simplest form, by a mechanical perturbation of the cavity mirrors or by a quick translation of an intracavity prism. Other methods of initiating mode locking include transverse-mode beating, the use of an intracavity saturable absorber or glass filter, acousto-optic modulation, and the use of an external cavity with a nonlinear reflector or a moving mirror.

The use of a moving mirror to initiate the mode-locking in linear cavities has the advantages that it is uncomplicated and inexpensive, is not wavelength dependent, no intracavity dispersive elements are required, and the parameters of external cavity length and mirror modulation are not critical. However, this process has the disadvantage that it requires continuous feedback into the cavity during mode-locked operation, with the feedback being collinear with the normal output. This feedback destroys the femtosecond mode locking, resulting in picosecond mode locking, except for one particular alignment of the external cavity.

SUMMARY OF THE INVENTION

It is, therefore an object of the present invention to provide an improved method for initiating self-mode-locked operation in a laser.

More particularly, it is an object of the invention to provide self-starting, self-mode-locked operation of a laser which is completely unperturbed by the external cavity once the laser is mode locked.

Briefly, a ring laser in accordance with the present invention comprises, in a preferred embodiment, a Ti:-sapphire (Ti:S) crystal mounted in a ring cavity which includes a pair of curved mirrors and an output coupling mirror. The Ti:S crystal is pumped by an argon laser to produce a continuous wave output in both clockwise (CW) and counterclockwise (CCW) directions, independent of cavity alignment. The alignment of the cavity is adjusted, as by adjusting one of the curved mirrors in the ring, for maximum continuous-wave power in one direction; for example, CCW. This adjustment makes the selected direction dominant for mode-locked operation.

Mode-locking is initiated in the ring cavity by means of an external cavity which incorporates a moving mirror. A selected continuous wave output, for example the CW output, passes through the ring output coupling mirror into the external cavity. This output beam travels along the axis of the external cavity to the moving mirror, and is retroreflected back along the axis into the ring cavity in the CCW direction. The distance from the output coupler to the moving mirror is selected so that a retroreflected CW pulse will interfere with a corresponding CCW pulse in the Ti:S crystal. This distance is not critical, although self-starting may be delayed for variations from the optimal distance. The axial position of the moving mirror in the external cavity is then modulated along the path of the beam to increase and decrease the distance between the output coupler and the moving mirror to initiate the mode-locking in the ring-cavity. The mirror is preferably modulated at a frequency of between about 30 and about 200 Hz, to self-start mode-locked operation in 5–10 ms and to produce a stable pulse train.

The establishment of mode locking thus forces unidirectional operation of the Ti:sapphire laser in, for example, the CCW direction. This destroys the CW beam direction and decouples the external cavity from the mode-locked laser. Because of this decoupling, the self-starting mechanism is only present when the laser is not mode-locked. Although a modulated mirror is preferred for self-starting operation of the laser, this mirror can be replaced by other phase modulators that would produce the same effect. Furthermore, although a Ti:S crystal is preferred, other crystals that will operate in the femtosecond domain, such as Chromium Forsterite ($Mg_2SiO_4Cr^{3+}$), may also be used.

BRIEF DESCRIPTION OF DRAWINGS

The foregoing, and additional objects, features and advantages of the present invention will become apparent to those of skill in the art from a consideration of the following detailed description of a preferred embodiment of the invention, taken in conjunction with the accompanying drawings, in which.

DESCRIPTION OF PREFERRED EMBODIMENT

Figure 1:
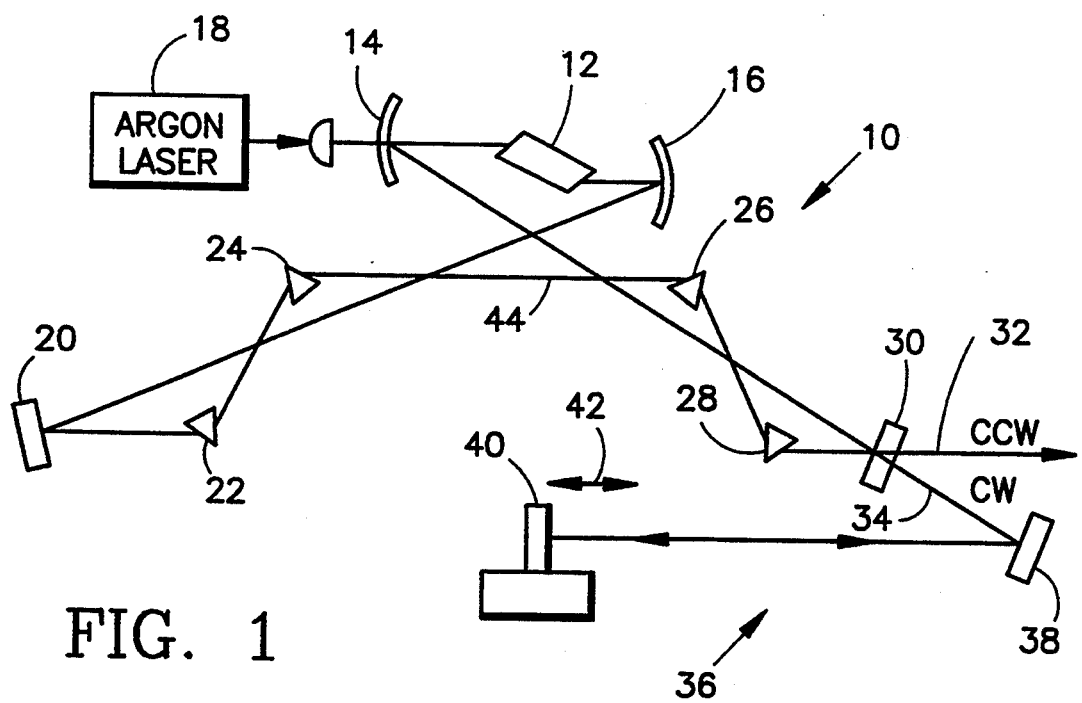
FIG. 1 is a diagrammatic illustration of a Ti:sapphire ring-cavity laser in accordance with the present invention.

Turning now to a more detailed consideration of the present invention, there is illustrated in FIG. 1. a ring cavity laser 10, which preferrably incorporates a Ti:sapphire crystal 12 located between a pair of concave mirrors 14 and 16. Crystal 12 may be mounted in a copper block that is cooled by a thermoelectric cooler with temperature feedback to maintain a constant temperature. The crystal is pumped by an argon laser 18 operating at, for example, 15 W, the pumping beam being supplied to the ring laser cavity through mirror 14 and being focused on one end of crystal 12. The pumping of crystal 12 produces a continuous-wave output in clockwise (CW) and counterclockwise (CCW) directions within ring cavity 10, independently of cavity alignment.

In addition to mirrors 14 and 16, the ring cavity 10 includes, in sequence in the CCW direction starting at mirror 16, a flat reflecting mirror 20, four SF-14 prisms 22, 24, 26 and 28, an output coupler 30, and the mirror 14. The output coupler 30 allows a portion of the CCW beam to pass through the coupler to produce output beam 32. The CW beam produced by the crystal 12 travels in the reverse direction in ring cavity 10, with a portion 34 of the CW beam passing through output coupler 30 into an external cavity 36. The external cavity includes reflective mirrors 38 and 40, with mirror 40 being movable along the axis of beam 34, in a reciprocating motion as illustrated by arrows 42. The CW output beam 34 is retroreflected by mirrors 40 and 38 back through output coupler 30 into the ring cavity 10 in the CCW direction to self-start the mode-locking operation of the ring laser, and to force unidirectional output in the CCW direction.

Although continuous-wave output occurs in both directions within cavity 10, it has been found that mode-locked operation only occurs in one direction, which is alignment dependent. The probability of mode-locked output in either direction appears to be equal, but adjusting the alignment for maximum continuous-wave power in one direction tends to make that direction dominant for mode-locked operation, apparently because of gain asymmetry. Adjustment for maximum power in the CCW direction ensures that in mode-locked operation, the laser beam will pass through the prism sequence just before it leaves the cavity. Autocorrelation measurements show that the pulse width is about 95 fs (assuming a sech$^2$ temporal profile) for alignment that favors the CW direction and 60 fs for the CCW direction using SF-14 prisms. The time-bandwidth product is about 0.4 for the 60 fs measurement, suggesting that much shorter pulse widths should be obtainable with less dispersive prism glass.

The Ti:sapphire ring laser illustrated in FIG. 1 typically produces about 2.0 W (at 780 nm) of stable, mode-locked output with an approximately TEM$_{00}$ mode. No satellite pulses in the output train are evident on an oscilloscope trace or on an autocorrelation trace.

As noted above, the external cavity 36 is aligned with the output beam 34 from the ring cavity 10 to retroreflect the continuous wave CW beam output back into the cavity in the CCW direction. The output cavity length, which is the distance from the output coupler 30 to the moving mirror 40, is adjusted so that the retroreflected CCW pulse will interfere with a corresponding CW pulse in the Ti:sapphire crystal 12. The optimal, or matched length is approximately equal to ½ the difference in optical path lengths between (a) the CCW path from the crystal to the output coupler 30 through the prism sequence and (b) the CW path from the crystal 12 to the output coupler 30. The external cavity length is not critical, and may be varied by more than one cm. However, the self-starting of mode locking is delayed slightly for length variations greater than about 2 mm from the matched length position.

Modulation of the axial position of the external cavity mirror along the beam path, and thus of the output cavity length, is required to initiate mode locking; self-starting is not produced by a stationary mirror at any external cavity length. The frequency and amplitude of the modulation can be varied over a wide range of values. In experiments it has been found that at low frequencies, in the range of 5 Hz, the minimum amplitude of motion to achieve self-starting is about 5 mm, while at higher frequencies, in the range of 200 Hz, the amplitude required for self-starting is only about 100 μm. In the preferred embodiment of the invention illustrated in FIG. 1, it has been found that the quickest and most reliable self-starting occurs with a modulation frequency between about 30 and about 200 Hz. It appears that self-starting is related to the velocity of mirror 40 during its modulating motion, with a minimum velocity of about 20 mm per sec being required for self-starting. Mirror 40 may be a thin aluminum mirror of low mass and may be modulated by mounting it on, for example, a piezoelectric speaker element which is driven by a suitable voltage.

Figure 2:
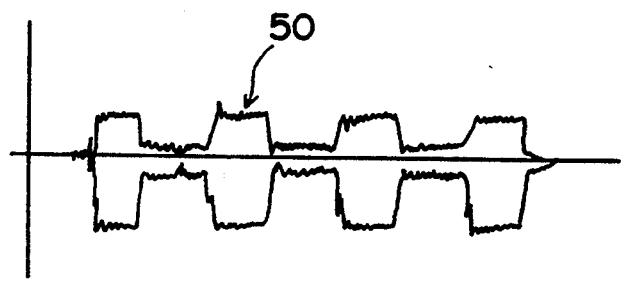
FIG. 2 is a diagrammatic illustration of oscilloscope traces of the pulse train obtained from the Ti:sapphire ring cavity laser of FIG. 1., illustrating the repeatability of self-starting.

The initiation of mode-locking is illustrated FIG. 2 wherein the intracavity Ti:sapphire beam 44 is chopped at 4 Hz and the resulting pulse train viewed on a fast oscilloscope triggered by the chopper. For the display of FIG. 2, the mirror 40 is modulated at 200 Hz, corresponding to a 5 ms time period, and at a low amplitude, producing the oscilloscope trace generally indicated at 50. The trace 50 is shown at 0.1 second per division, and demonstrates that self-starting occurs consistently for each chop cycle.

Figure 3:
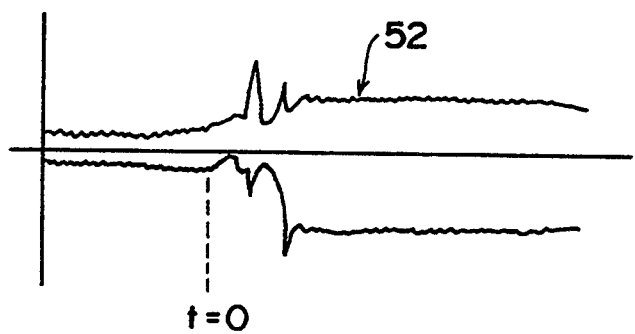
FIG. 3. is a diagrammatic illustration of an oscilloscope trace of the Ti:sapphire ring cavity laser of FIG. 1., illustrating the quick start-up time of the laser.

An expanded view of the start up is illustrated in FIG. 3, which has a 5 millisecond per division time scale. In this figure, trace 52 illustrates that the start up occurs in 5–10 ms, and produces a stable pulse train having less than 0.5% rms fluctuation. Although not illustrated, a delayed startup was observed when the external cavity 36 was misaligned or the length was varied by more than about 2 mm from the matched length position. In the case of delayed startup, a series of peaks and nodes were produced in the trace prior to mode locking, these peaks and nodes being synchronized to the motion of the mirror 40, the nodes corresponding to the zero velocity points. The quickest initiation of mode locking occurs in one period of the motion of mirror 40, which makes a higher modulation frequency more attractive.

As previously noted, the establishment of mode locking forces unidirectional operation of the laser, and this destroys the CW beam direction and thus decouples the external cavity from the laser. Thus, the self-starting mechanism is only present when the laser is not mode locked, and the external cavity is effectively blocked during continuous mode-locked operation. As a result, mode locked operation is completely unperturbed by the external cavity.

Among the benefits of the ring cavity configuration of FIG. 1 over linear cavity configurations is the fact that under higher pump power conditions, a linear cavity tends to allow additional pulses to form. Such satellite or double pulsing can result in less stable mode locking. A ring cavity is less apt to allow additional pulses to form at least in part because a ring cavity has greater asymmetry between the two possible lasing directions than does a linear cavity. In addition, as noted above, the mode-locking in the ring cavity is relatively insensitive to retroreflection of the beam back into the cavity, due to the fact that the retroreflected light is injected in a direction opposite to the unidirectional lasing. In a linear cavity even slight retroreflection of the laser beam generally destroys the mode locking, with the result that an optical isolator must be inserted after the output coupler when using a linear cavity.

Still another benefit of the ring cavity of the present invention is the reduced dispersion of the gain medium because the pulse travels through the Ti:sapphire crystal only once per round trip. Short pulse widths are generated using less dispersive prisms at greater separations because this reduces the overall third-order dispersion, most of which is produced by the prisms, while still compensating for the group-velocity dispersion. Furthermore, the use of a shorter Ti:sapphire crystal with a greater $Ti^{3+}$ doping concentration can still support mode locking, but with less dispersion, which allows the use of even less-dispersive prisms. In a ring cavity, the dispersion is intrinsically reduced by a factor of 2 over that of a linear cavity, thus allowing production of the shortest pulses. It is noted that a single pass through the gain medium per round trip, as occurs in a ring cavity, does not preclude the ability to produce high output power, with the device of FIG. 1 typically producing 2.0 W of single-pulse output power.

In summary, there has been described a self-starting self-mode-locked ring-cavity laser that initiates mode locking in milliseconds by utilizing a position-modulated mirror in an external cavity. The mode-locked operation of the laser is completely unperturbed by the external cavity because the external cavity only initiates mode locking and is blocked during continuous mode-locked operation. The self-starting operation is inexpensive, simple to align, and requires no intracavity elements. With low dispersion prisms, short pulse widths are obtainable in the preferred embodiment, since the dispersion of a Ti:sapphire crystal is a factor of 2 less than that of a linear cavity configuration. Although the present invention has been described in terms of a preferred embodiment, it will be apparent that variations and modifications, such as the use of other laser crystals and the use of different prism materials, may be made without departing from the true spirit and scope thereof, as set forth in the following claims.

What is claimed is:

1. A self-starting, mode-locked femtosecond laser comprising:
   a laser cavity having a pair of spaced, aligned, curved mirrors and optical means including at least an output coupler;
   a laser crystal located between said curved mirrors;
   pump means supplying a pumping beam to said crystal, to produce first and second, oppositely directed continuous wave beams in said laser cavity, at least a portion of each of said beams passing out of said laser cavity through said output coupler;
   an external cavity receiving said first beam and retroreflecting said first beam back into said laser cavity; and
   means in said external cavity for modulating said retroreflected beam to start mode-locked lasing operation in said laser cavity and to force unidirectional operation in the direction of said second beam.

2. The self-starting, mode-locked laser of claim 1, wherein said means in said external cavity for modulating said retroreflected beam includes a mirror movable in the direction of said first beam.

3. The self-starting, mode-locked laser of claim 2, wherein said means for modulating said retroreflected beam further includes modulator means mounting said mirror for reciprocating motion in the direction of said first beam.

4. The self-starting, mode-locked laser of claim 1, wherein said external cavity has a length approximately equal to ½ the difference in optical path lengths between (a) the path of said first beam between said crystal and said output coupler and (b) the path of said second beam between said crystal and said output coupler.

5. The self-starting, mode-locked laser of claim 4, further including adjustment means for adjusting said ring cavity to produce maximum power in a selected one of said first and second beams to thereby select said unidirectional operation.

6. The self-starting, mode-locked laser of claim 1, wherein said laser cavity is a ring cavity, and wherein said first and second oppositely directed waves comprise clockwise and counterclockwise waves.

7. The self-starting, mode-locked laser of claim 6, wherein said external cavity is arranged to receive one of said clockwise and counterclockwise beams.

8. The self-starting, mode-locked laser of claim 7, wherein said means for modulating comprises a mirror movable in the direction of said one beam.

9. The self-starting, mode-locked laser of claim 7, wherein said laser crystal is a Ti:Sapphire crystal.

10. The self-starting, mode-locked laser of claim 7, wherein said laser crystal is a crystal capable of operating in the femtosecond domain.

11. A method for self-starting, mode-locked operation of a ring laser, comprising:
   pumping a laser crystal located in a ring laser to produce continuous wave clockwise (CW) and counterclockwise (CCW) light beams;
   directing a portion of a selected one of said CW and CCW beams into an external cavity; and
   retroreflecting the selected portion of said one of said CW and CCW beams back into said ring cavity to interfere with the other of said CW and CCW beams in said crystal to thereby initiate unidirectional mode-locked operation in the direction of said other of said CW and CCW beams, thereby destroying said one of said CW and CCW beams to decouple said external cavity from said ring laser during continuous mode-locked operation.

* * * * *